(12) United States Patent
Lee et al.

(10) Patent No.: US 7,745,536 B2
(45) Date of Patent: Jun. 29, 2010

(54) COMPOSITION OF ACRYL-SILICONE COMPLEX, PREPARING METHOD AND USE THEREOF

(75) Inventors: Kwang-jin Lee, Busan (KR);
Jeong-heon Ahn, Yeosu-si (KR);
Hye-kyong Lee, Jeollabuk-do (KR);
Boo-ho Seo, Yeosu-si (KR); Ji-min Lee, Cheonan-si (KP)

(73) Assignee: LG Chem, Ltd. (KR)

( * ) Notice: Subject to any disclaimer, the term of this patent is extended or adjusted under 35 U.S.C. 154(b) by 741 days.

(21) Appl. No.: 11/549,214

(22) Filed: Oct. 13, 2006

(65) Prior Publication Data

US 2007/0100073 A1      May 3, 2007

(30) Foreign Application Priority Data

Oct. 13, 2005  (KR) ...................... 10-2005-0096512

(51) Int. Cl.
*C08F 30/08* (2006.01)
*C08F 30/00* (2006.01)

(52) U.S. Cl. ...................... 525/100; 525/418; 525/474; 525/479; 525/902; 525/903; 525/191

(58) Field of Classification Search ................ 525/67, 525/100, 148, 446, 464, 439, 903, 191, 418, 525/451, 474, 479, 902
See application file for complete search history.

(56) References Cited

U.S. PATENT DOCUMENTS

| 4,788,240 | A | * | 11/1988 | Fujimoto | ..................... 524/290 |
| 4,888,388 | A | * | 12/1989 | Hongo et al. | .................. 525/67 |
| 5,132,359 | A | | 7/1992 | Sasaki et al. | |
| 5,654,052 | A | * | 8/1997 | Visser et al. | ............... 428/35.8 |
| 6,153,694 | A | | 11/2000 | Miyatake et al. | |

FOREIGN PATENT DOCUMENTS

WO      WO 2004058839 A1 *    7/2004

\* cited by examiner

*Primary Examiner*—Irina S Zemel
*Assistant Examiner*—Jeffrey Lenihan
(74) *Attorney, Agent, or Firm*—Cantor Colburn LLP

(57) ABSTRACT

The present invention relates to an acryl-silicon rubber complex polymer which has a seed-core-shell structure wherein vinyl monomer and hydrophilic monomer are cross-linked on the seed; the acryl-silicon complex IPN core having an IPN (interpenetrating network) structure formed by radical polymerization of acryl monomer and hydrosilyation of silicon rubber in which silicon rubber particles are dispersed by being cross-linked to acryl rubber, in a continuous phase, is formed on the seed; and a shell prepared by graft-polymerization of $C_1$-$C_4$ alkyl methacrylate to the acryl-silicon complex IPN core is formed on the core, and a method of preparation and use of the same, thereby having excellent impact resistance, weatherability and gloss, so that it can be effectively used as an impact modifier for vinyl chloride resin.

13 Claims, No Drawings

COMPOSITION OF ACRYL-SILICONE COMPLEX, PREPARING METHOD AND USE THEREOF

This application claims the benefit of the filing date of Korean patent Application No. 10-2005-0096512 filed on Oct. 13, 2005 in the Korean Intellectual Property Office, the disclosure of which is incorporated herein in its entirety by reference.

TECHNICAL FIELD

The present invention relates to an acryl-silicone rubber complex polymer having excellent impact resistance, weatherability and gloss, which is applicable as an impact modifier in a vinyl chloride resin composition.

BACKGROUND ART

An impact modifier used to improve the impact resistance of a vinyl chloride resin is exemplified by methyl methacrylate butadiene styrene (MBS) resin, ethylene chloride (CPE) resin and acrylic resin.

To improve the impact resistance of a thermoplastic resin, a rubber polymer having as low a glass transition temperature (Tg) as possible is used. Among the rubber polymers, polybutadiene rubber added to HIPS, ABS and MBS resin has a glass transition temperature of about −80° C., which is much lower than the glass transition temperature (−50° C.) of polybutylacrylate which is a rubber component used as an acrylic modifier, suggesting that the polybutadiene rubber has excellent impact resistance. However, the polybutadiene rubber contains unsaturated double bonds, indicating that it shows weak thermal stability and low weatherability In the meantime, acrylic resin which does not include unsaturated double bonds has excellent weatherability, so that it has been widely used as an impact modifier for outdoor plastic products which happen to be exposed to sunshine for a long time. For example, for products requiring excellent impact resistance and weatherability together, like a window frame etc, a polymer having a core-shell structure is applied, which is prepared by graft-copolymerization of methacryl polymer, which has excellent compatibility with vinyl chloride resin, with a rubber core composed of alkyl acrylate. However, the glass transition temperature thereof is higher than that of butadiene rubber, so the enhancement of impact resistance is insufficient.

Polyorganosiloxane, which is also called polydimethylsiloxane, has a glass transition temperature (Tg) of approximately −120° C., suggesting that this polymer is very effective for the enhancement of impact resistance. Thus, acryl-silicon rubber complex graft copolymer particles containing silicon can be effectively used to improve weatherability and impact resistance.

Major factors affecting the properties of the acryl-silicon rubber complex impact modifier having a core-shell structure are the rubber content in the impact modifier, the size of the rubber particles, the distance between rubber particles, the swelling index for a solvent, and the degree of coupling between the impact modifier particles dispersed by processing and a matrix. In particular, the bond between an impact modifier and a matrix depends on the shell-graft efficiency for the impact modifying rubber core.

The acryl-silicon rubber complex impact modifier for improving impact resistance of a vinyl chloride resin is prepared by the conventional emulsion polymerization, which is described in the following references.

First, U.S. Pat. No. 5,132,359 describes how polydimethylsiloxane rubber seed is polymerized, followed by growing the rubber particles with a butyl acrylate monomer added as a rubber core, and then a shell-forming component is added to cover the surface of the core to complete the core-shell structure.

Second, U.S. Pat. No. 6,153,694 describes polydimethylsiloxane rubber latex, which is 100 nm or less, and polybutylacrylate latex being polymerized respectively, rubber particles are grown by agglomeration, and then a capsulated shell is formed, leading to microagglomeration to form the core-shell structure.

The problem with the above two methods is a long polymerization time due to the separate silicon polymer polymerizations. Particularly, to prepare silicon rubber, polymerization is performed by using cyclic organosiloxane as a precursor and organosilane as a cross-linking agent in the presence of an acid catalyst, and then separate neutralization and aging are required.

During the shell-polymerization, methylmethacrylate monomer having excellent compatibility with vinyl chloride resin is graft-polymerized onto the core surface or graft-polymerized with a small amount of another monomer having at least two functional groups. In particular, methyl methacrylate has excellent compatibility with a matrix and a high glass transition temperature, so it can play a role in improving the agglomeration of latex. To increase the dispersibility of an impact modifier in a matrix, a small amount of acrylonitrile monomer is effectively added during the shell polymerization.

DISCLOSURE OF THE INVENTION

It is an object of the present invention, to solve the above problems, to provide an acryl-silicon rubber complex polymer having excellent impact resistance, weatherability and gloss and a method of preparing the same.

It is another object of the present invention to provide a use for the acryl-silicon rubber complex polymer composition.

The above object and other objects of the present invention can be achieved by the following embodiments of the present invention.

To achieve the above objects, an embodiment of the present invention provides an acryl-silicon rubber complex polymer which has a seed-core-shell structure, an impact strength of 50~130 kg-cm/cm and gloss of 50~70. More precisely, the acryl-silicon rubber complex polymer of the present invention has a seed with a cross-linking structure between a vinyl monomer and a hydrophilic monomer and is polymerized with 65~99 weight part of the vinyl monomer, 0.5~30 weight part of the hydrophilic monomer and 0.5~5 weight part of a cross-linking monomer. An acryl-silicon complex IPN core having an interpenetrating network (IPN) structure in which silicon rubber particles are dispersed by being cross-linked with acryl rubber is formed on the seed, and on the acryl-silicon complex IPN core a shell prepared by graft-polymerization of a C1~C4 alkyl methacrylate polymer selected from a group consisting of methyl methacrylate, ethyl methacrylate, propyl methacrylate, butyl methacrylate and isopropyl methacrylate is formed.

The mean diameter of the acryl-silicon rubber complex polymer prepared above is 200 nm~450 nm and the glass transition temperature is −120~−30° C.

The present invention also provides a method of preparing acryl-silicon rubber complex polymer, comprising the following steps:

a) preparing an acryl-silicon complex IPN core having an IPN structure by performing an addition polymerization of a seed latex with C1~C8 alkyl acrylate, a cross-linking agent monomer, polydimethylsiloxane harboring a vinyl terminal, and a pre-emulsion containing polymethylhydrogensiloxane;

b) performing microagglomeration by adding an organic acid or salt to the acryl-silicon complex IPN core; and c) forming a shell by emulsion graft-polymerization of the acryl-silicon complex IPN core with C1~C4 alkyl methacrylate.

The present invention further provides a use for the acryl-silicon rubber complex as an impact modifier for a vinyl chloride resin composition.

Hereinafter, the present invention is described in detail.

The acryl-silicon rubber complex of the present invention has excellent impact resistance, weatherability and gloss, so that it can be effectively used as an impact modifier for a vinyl chloride resin composition. The acryl-silicon complex IPN core is characterized by an IPN (Interpenetrating Network) structure constructed by radical polymerization of an acryl monomer and a hydrosilyation of silicon rubber.

Particularly, the acryl-silicon rubber complex of the present invention has a structure composed of the acryl-silicon complex IPN core in which cross-linked organic silicon rubber particles are dispersed in acryl rubber, a continuous phase, and an acrylate rubber shell covering the core.

The acryl-silicon complex IPN core can lower the glass transition temperature of the whole impact modifier owing to the cross-linked polydimethylsiloxane rubber, having a low glass transition temperature, dispersed in the acryl rubber. Therefore, with a small amount of organic siloxane polymer the acryl-silicon complex IPN core contributes to the enhancement of impact resistance, weatherability and gloss.

The acryl rubber used for the shell is compatible with vinyl chloride resin and has a comparatively high glass transition temperature. Thus, using the acryl rubber results in the improvement of agglomeration of the final acryl impact modifier product and accelerating the dispersal of the impact modifier particles during the processing owing to the excellent compatibility with vinyl chloride resin matrix.

The method of preparing the acryl-silicon rubber complex is composed of the following steps:

a) preparing an acryl-silicon complex IPN core having an IPN structure by polymerizing a seed latex with C1~C8 alkyl acrylate, a cross-linking agent monomer, polydimethylsiloxane harboring a vinyl terminal, and a pre-emulsion containing polymethylhydrogensiloxane;

b) performing microagglomeration by adding an organic acid or salt to the acryl-silicon complex IPN core; and c) forming the shell by graft-polymerization of the acryl-silicon complex IPN core with C1~C4 alkyl methacrylate.

Preparation of the Seed Latex

The seed latex is prepared by emulsion polymerization with 65~99 weight part of a vinyl monomer, 0.5~30 weight part of a hydrophilic monomer and 0.5~5 weight part of a cross-linking agent monomer for 100 weight part of the seed latex composition, but is not always limited thereto.

The applicable vinyl monomer is one or more compounds selected from a group consisting of styrene, α-methyl styrene, vinyl toluene, and 3,4-dichloro styrene.

The hydrophilic monomer herein is one or more compounds selected from a group consisting of alkyl acrylate such as ethyl acrylate, butyl acrylate and 2-ethylhexyl acrylate; alkyl methacrylate such as methyl methacrylate and benzyl methacrylate; acrylonitrile; hydroxyl methyl methacrylate; and glycidyl methacrylate.

The cross-linking agent monomer is one or more compounds selected from a group consisting of divinyl benzene, 3-butandiol diacrylate, 1,3-butandiol dimethacrylate, 1,4-butandiol diacrylate, 1,4-butandiol dimethacrylate, allyl acrylate, allyl methacrylate, trimethylolpropane triacrylate, tetraethyleneglycol diacrylate, and tetraethyleneglycol dimethacrylate. In particular, divinyl benzene is preferred to increase the cross-linking efficiency of the vinyl monomer.

The seed latex is preferably prepared to be 40 nm~120 nm. If the size of the seed latex is smaller than the above range, the impact strength will be decreased but the latex viscosity will be increased. On the other hand, if the size of the seed latex is bigger than the above range, gloss will be reduced.

Preparation of the Acryl-Silicon Complex IPN Core

Unlike the conventional method of preparing an acryl-silicon complex IPN core, which is done by blending separately polymerized acryl rubber and silicon rubber, the method of the present invention comprises the steps of radical polymerization of an acryl monomer; hydrosilylation of silicon rubber; and then polymerization thereof to form the IPN structure more easily.

Particularly, the acryl-silicon complex IPN core is prepared by the following steps:

i) To the seed latex is added the pre-emulsion composed of an acryl monomer and a cross-linking agent monomer to form acryl rubber, polydimethylsiloxane harboring a vinyl terminal and polymethylhydrogensiloxane to form a non-continuous phase silicon rubber, ii) Acryl rubber radical polymerization is performed at 50~100 C., to which a transition metal compound (VIII) as a silicon rubber polymerization catalyst is added, followed by hydrosilylation.

The acryl monomer used to form the acryl rubber is preferably C1~C8 alkyl acrylate. And the C1~C8 alkyl acrylate can be one or more compounds selected from a group consisting of methyl acrylate, ethyl acrylate, propyl acrylate, isopropyl acrylate, butyl acrylate, hexyl acrylate, octyl acrylate and 2-ethylhexyl acrylate. It is more preferred to select ethyl acrylate, 2-ethylhexyl acrylate, butyl acrylate or a mixture of them as the C1~C8 alkyl acrylate.

The preferable content of the C1~C8 alkyl acrylate monomer in the total acryl rubber is 97.0~99.9 weight part. If the content of the acryl monomer is less than 97.0 weight part, the core will be brittle. On the contrary, if the content is more than 99.9 weight part, the round particles in the matrix will be transformed, resulting in a decrease of the impact-modifying effect.

The cross-linking agent monomer to form the acryl rubber is preferably one or more compounds selected from a group consisting of 3-butandiol diacrylate, 1,3-butandiol dimethacrylate, 1,4-butandiol diacrylate, 1,4-butandiol dimethacrylate, allyl acrylate, allyl methacrylate, trimethylolpropane triacrylate, tetraethyleneglycol diacrylate, tetraethyleneglycol dimethacrylate and divinyl benzene. It is more preferred to select 1,3-butandiol diacrylate, 1,3-butandiol dimethacrylate, allyl acrylate, allyl methacrylate or a mixture of them as the cross-linking monomer.

The preferable content of the cross-linking agent monomer in the whole acryl rubber is 0.1~3.0 weight part. If the content of the cross-linking agent is less than 0.1 weight part, the round particles in the matrix will be transformed during the processing. On the contrary, if the content is more than 3.0 weight part, the core will be brittle, resulting in a decrease of the impact-modifying effect.

The polydimethylsiloxane harboring a vinyl terminal to form the silicon rubber has a weight average molecular weight (MW) of 4,000~50,000 g/mol. If the weight average molecular weight of the polydimethylsiloxane is less than 4000 g/mol, the impact strength of the final acryl-silicon rubber complex will be reduced. On the contrary, if the weight average molecular weight is more than 50,000 g/mol, the viscosity will increase during the polymerization, suggesting that the regulation of the reaction might be difficult.

The preferable content of the polydimethylsiloxane harboring vinyl terminal for 100 weight part of the silicon rubber is 97.0~99.9 weight part. If the content of the polydimethylsiloxane harboring vinyl terminal is less than 97.0 weight part, the core will be brittle. On the contrary, if the content is more than 99.9 weight part, the impact resistance will be poor.

The polymethylhydrogensiloxane, used as a silicon rubber cross-linking agent for composing silicon rubber, has a weight average molecular weight of 1000~15,000 g/mol. If the weight average molecular weight is out of the above range, the impact strength will be reduced or the reaction cannot be controlled properly due to the above mentioned reasons.

The preferable content of the polymethylhydrogensiloxane for 100 weight part of the silicon rubber is 0.1~3.0 weight part. If the content of the polymethylhydrogensiloxane is less than 0.1 weight part, the impact resistance will be poor. On the contrary, if the content is more than 3.0 weight part, the core will be brittle, indicating a decrease of the impact-modifying effect.

The pre-emulsion contains 0.1~10 weight part of the seed latex and 60~90 weight part of acryl rubber monomer and silicon rubber to form the core. The preferable ratio of acryl rubber monomer to silicon rubber is 70~99.9:0.1~30 weight part.

The pre-emulsion is then polymerized at 50~100° C., and more preferably at 60~90° C., in the presence of a catalyst to prepare the acryl-silicon complex IPN core.

The catalyst for the silicon rubber polymerization is preferably selected from a group consisting of transition metal compounds (VIII), Pt, Rd, Co, Pd and Ni. It is more preferred to select Pt as the catalyst.

The pre-emulsion can additionally include any conventional emulsifying agent or polymerization initiator for emulsion polymerization.

In the structure of the acryl-silicon complex IPN core, silicon polymer is physically blended with acryl polymer by being cross-linked to the rubber. The glass transition temperature of the core is a medium single temperature between the Tg of silicon polymer (−120~−100° C., in general) and the Tg of acryl polymer (−50~−30° C., in general).

The prepared acryl-silicon complex IPN core progresses to microagglomeration in the presence of an organic acid or salt to give particles in the range of 150 nm~445 nm. If the particle size of the core is less than 150 nm, the low-temperature impact strength of the final acryl-silicon rubber complex will be reduced. On the contrary, if the particle size is more than 445 nm, gloss will be poor. Thus, the particle size has to be regulated in the above range.

The organic acid or salt used for the microagglomeration is selected from a group consisting of acetic acid, hydrochloric acid, sulfuric acid, formic acid, acrylic acid copolymer, sodium chloride, sodium sulfate and sodium hydrogen carbonate, or any other general compound that is acceptable in this field can be used.

Preparation of the Shell

The acryl-silicon complex IPN core, whose particle size has been regulated, is covered with an acryl monomer by polymerization, and thus the acryl-silicon rubber complex polymer having a core-shell structure is prepared.

Particularly, 10~40 weight part of a C1~C4 alkyl methacrylate monomer is added to 60~90 weight part of the acryl-silicon complex IPN core, followed by emulsion polymerization, which leads to grafting acryl polymer to the core. For the graft-polymerization to form the shell, any conventional emulsifying agent or polymerization initiator can be used.

The C1~C4 alkyl methacrylate monomer has to be compatible with vinyl chloride resin and can be selected from a group consisting of methyl methacrylate, ethyl methacrylate, propyl methacrylate, butyl methacrylate, and isopropyl methacrylate.

To regulate the glass transition temperature of the shell and to increase compatibility with other compounds, a supplementary monomer can be applied. The supplementary monomer is preferably a nitrile, such as acrylonitrile and methacrylonitrile, and the preferable content of the supplementary monomer for 100 weight part of the acryl monomer (the shell) is 0.1~20 weight part.

The thickness of the shell is 5 nm~50 nm, and the thickness can be regulated by adjusting the content of C1~C4 alkyl methacrylate. If the shell is less than 5 nm thick, gloss and the latex stability will be reduced. If the shell is more than 50 nm thick, agglomeration temperature will be higher and dust or micropowder will be generated. Thus, the thickness of the shell has to be in the above range.

Upon completion of the graft-polymerization of the shell, a general procedure follows to give the acryl-silicon rubber complex polymer powder. For example, agglomeration of the acryl-silicon rubber complex is performed in the presence of an electrolyte, organic acid or inorganic acid after grafting, followed by filtering and drying to give an impact modifying powder. The electrolyte for the agglomeration can be such inorganic compounds as calcium chloride and magnesium sulfate. The agglomeration can be performed by the conventional agglomeration method for the acryl impact modifier latex.

The acryl-silicon rubber complex prepared above has a mean diameter of 200 nm~450 nm, a glass transition temperature of −120~−50° C., an impact strength of 50~130 kg-cm/cm and gloss of 50~70.

Vinyl Chloride Resin

The final acryl-silicon rubber complex powder used as an impact modifier will be well dispersed in the vinyl chloride resin, a matrix resin, once it is added to the vinyl chloride resin so as to increase impact resistance, weatherability and gloss by satisfying the requirements for rubber content, glass transition temperature, particle size and the distance between impact modifiers.

In particular, this complex can be efficiently applied as an impact modifier and the content of the complex is preferably determined as 1~20 weight part for 80~99 weight part of vinyl chloride resin in consideration of plasticity, impact resistance, weatherability, gloss and economic values.

The vinyl chloride resin can be effectively applied to every product based on vinyl chloride resin such as PVC siding, PVC window profiles, etc, which require efficiency in processing, high impact resistance and weatherability.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

Example 1

Preparation of the Seed Latex

To a 4-neck flask reactor equipped with a stirrer, a thermometer, nitrogen inlet and circulating condenser were added 40 weight part of deionized water (DDI water), 0.28 weight part of potassium oleate and 0.12 weight part of potassium persulfate.

The inside temperature of the reactor was raised to 70° C. in the presence of nitrogen. When the temperature reached 70° C., 7.15 weight part of styrene (ST), 0.79 weight part of acrylonitrile (AN) and 0.06 weight part of divinyl benzene (DVB) were added one at a time to the reactor to produce the seed latex.

The polymerization conversion rate of the seed latex was 99%, the mean diameter was 56 nm and the total solid content (TSC) was 15 weight %.

(Formation of the Acryl-Silicon Complex IPN Core)

To the seed latex were added 1.16 weight part of potassium persulfate and the complex monomer pre-emulsion composed of 30 weight part of deionized water, 72.6 weight part of butylacrylate (BA), 0.55 weight part of allyl methacrylate (AMA), 3.81 weight part of vinyl terminated polydimethylsiloxane (VPDMS, Mw=5000 g/mol), 0.04 weight part of polymethylhydrogensiloxane (PMHS, Mw=6000 g/mol), 0.02 weight part of Pt catalyst (product name: Syl-off®14000 Catalyst) and 1.16 weight part of potassium oleate to form the acryl-silicon complex IPN core, followed by reaction at 65° C. for 5 hours.

Upon addition of the complex monomer pre-emulsion and potassium persulfate, the reaction mixture was aged for one hour to complete the acryl-silicon complex IPN core.

The mean diameter of the formed acryl-silicon complex IPN core was 119 nm, the total solid content (TSC) was 42 weight % and the glass transition temperature was −59.5° C.

(Microagglomeration)

To the acryl-silicon complex IPN core latex was added 1.28 weight part of 5% sodium sulfate diluted in deionized water for two hours. Then, 0.10 weight part of sodium dodecyl benzene sulfonate (SDBS) was added thereto, followed by microagglomeration.

The mean diameter of the microagglomerated acryl-silicon complex IPN core was 274 nm.

(Formation of the Hard Shell)

The temperature of the reactor was raised to 55° C. for the shell polymerization, to which 5 weight part of ion exchange water, 15 weight part of methyl methacrylate (MMA), 0.023 weight part of n-dodecyl mercaptane (nDDM), 0.15 weight part of tert-butylhydroperoxide (TBHP), 0.21 weight part of disodiumethylenediaminetetraacetate (EDTA), 0.011 weight part of ferrous sulfate (FeS), and 0.174 weight part of formaldehyde sodium sulfoxylate (SFS) were added one at a time, followed by reaction.

The mean diameter of the final acryl-silicon rubber complex was 298 nm and the total solid content was 40 weight %.

(The Acryl-Silicon Rubber Complex Powder)

To the acryl-silicon rubber complex was added ion exchange water to lower the solid content to 10 weight %. The reaction solution was cooled down to 24° C. To the diluted latex was added calcium chloride solution (diluted to 10 weight %) with stirring, followed by agglomeration of the polymer particles to give an agglomerated slurry.

The temperature of the agglomerated slurry was raised to 90° C., followed by aging for 30 minutes and cooling. The agglomerated slurry was washed with ion exchange water three times to eliminate monomer residues, followed by dehydrating with a filter.

The dehydrated impact modifier was dried in the fluidized bed dryer at 80° C. for 2 hours to give the acryl-silicon rubber complex powder (glass transition temperature: −36.2° C.).

(Preparation of Vinyl Chloride Resin)

100 weight part of polyvinylchloride resin (PVC; LG Chem. Ltd., LS-100, polymerization degree=1000), 4.0 weight part of heat stabilizer (DLP), 0.9 weight part of calcium stearate (Ca-St), 1.36 weight part of polyethylene wax (PE Wax), 1.0 weight part of processing additive (LG Chem. Ltd., PA-821), 5.0 weight part of $CaCO_3$ and 4.0 weight part of $TiO_2$ were mixed in a mixer at room temperature. The temperature of the mixer was raised to 115° C. at 1000 rpm for complete mixing. When the temperature reached 115° C., the mixing speed was adjusted to 400 rpm and the temperature was lowered to 40° C., resulting in the master batch.

To the master batch was added 6 weight part of the acryl-silicon rubber IPN complex as an impact modifier, followed by milling at 190° C. for 7 minutes using a 2-roll-mill to give a 0.6 mm thick sheet.

The pieces were loaded on a mold (3×170×220 mm), which was preheated for 8 minutes by using a 190° C. heating press (pressure: 0.5 kg), pressed for 4 minutes (pressure: 10 Kgf) and then cooled down for 3 minutes (pressure: 10 Kgf) to give a 3 mm thick vinyl chloride resin sheet.

Example 2

To an acryl-silicon complex IPN core prepared in the same manner as described in Example 1 was added 2.55 weight part of 5% sodium sulfate solution (diluted in deionized water) for 2 hours of microagglomeration. The hard shell polymerization was performed in the same manner as described in Example 1.

The mean diameter of the final acryl-silicon rubber complex was 429 nm, the total solid content was 37 weight % and the glass transition temperature was −36.6° C.

Comparative Example 1

Microagglomeration was not performed for an acryl-silicon complex IPN core prepared in the same manner as described in Example 1. But, the hard shell polymerization was performed in the same manner as described in Example 1.

The mean diameter of the final acryl-silicon rubber complex latex was 130 nm, the total solid content was 43 weight % and the glass transition temperature was −36.5° C.

Comparative Example 2

To an acryl-silicon complex IPN core prepared in the same manner as described in Example 1 was added 3.40 weight part of 5% sodium sulfate solution (diluted in deionized water) for 3 hours of microagglomeration. The hard shell polymerization was performed in the same manner as described in Example 1.

The mean diameter of the final acryl-silicon rubber complex latex was 610 nm, the total solid content was 34 weight % and the glass transition temperature was −37.3° C.

Experimental Example 1

The vinyl chloride resins containing the acryl-silicon rubber complex as an impact modifier prepared in Examples 1~2 and Comparative Examples 1~2 were tested for impact strength, gloss and weatherability. The results are shown in Table 1.

A: Impact strength (kg·cm/cm): Test samples were prepared by cutting the resins very finely and then Izod impact strength was measured for each sample by ASTM D-265.

B: Gloss (%): Relative surface gloss was calculated by ASTM D523-62T and presented as a %, considering glass surface gloss as 100%.

TABLE 1

| Content (weight part) | | Example 1 | Example 2 | Comparative Example 1 | Comparative Example 2 |
|---|---|---|---|---|---|
| Seed | St | 7.15 | 7.15 | 7.15 | 7.15 |
| | AN | 0.79 | 0.79 | 0.79 | 0.79 |
| | DVB | 0.06 | 0.06 | 0.06 | 0.06 |
| Complex IPN core | BA | 72.60 | 72.60 | 72.60 | 72.60 |
| | AMA | 0.55 | 0.55 | 0.55 | 0.55 |
| | VPDMS | 3.81 | 3.81 | 3.81 | 3.81 |
| | PMHS | 0.04 | 0.04 | 0.04 | 0.04 |
| Microagglomeration | Sodium Sulfate | 1.28 | 2.55 | — | 3.40 |
| Hard shell | MMA | 15.0 | 15.0 | 15.0 | 15.0 |
| Mean diameter (nm) | | 298 | 429 | 130 | 610 |
| Izod impact strength (kg · cm/cm) | 23° C. | 115 | 108 | 98 | 105 |
| | −10° C. | 52 | 58 | 41 | 51 |
| Gloss (%) | | 55 | 51 | 51 | 35 |

As shown in Table 1, if the mean diameter of the final acryl-silicon rubber complex polymer is smaller than 200 nm or bigger than 450 nm, impact resistance or gloss will be reduced.

Example 3

To a seed latex prepared in the same manner as described in Example 1 were added 1.16 weight part of potassium persulfate and the complex monomer pre-emulsion composed of 30 weight part of deionized water, 74.51 weight part of butylacrylate (BA), 0.56 weight part of allyl methacrylate (AMA), 1.91 weight part of vinyl terminated polydimethylsiloxane (VPDMS, Mw=5000 g/mol), 0.02 weight part of polymethylhydrogensiloxane (PMHS, Mw=6000 g/mol), 0.01 weight part of Pt catalyst (product name; Syl-off®4000 Catalyst) and 1.16 weight part of potassium oleate, followed by reaction for 5 hours at 65° C. to prepare the acryl-silicon complex IPN core.

Microagglomeration and hard shell polymerization were performed in the same manner as described in Example 1. The glass transition temperatures of the core and the acryl-silicon rubber complex polymer were −57.3° C. and −34.1° C. respectively.

Example 4

To a seed latex prepared in the same manner as described in Example 1 were added 1.16 weight part of potassium persulfate and the complex monomer pre-emulsion composed of 30 weight part of deionized water, 72.60 weight part of butylacrylate, 0.55 weight part of allyl methacrylate, 3.81 weight part of vinyl terminated polydimethylsiloxane (VPDMS, Mw=5000 g/mol), 0.04 weight part of polymethylhydrogensiloxane (PMHS, Mw-6000 g/mol), 0.02 weight part of Pt catalyst (product name; Syl-off®4000 Catalyst) and 1.16 weight part of potassium oleate, followed by reaction for 5 hours at 65° C. to prepare the acryl-silicon complex IPN core.

Microagglomeration and hard shell polymerization were performed in the same manner as described in Example 1. The glass transition temperatures of the core and the acryl-silicon rubber complex polymer were −60.1° C. and −36.8° C. respectively.

Example 5

To a seed latex prepared in the same manner as described in Example 1 were added 1.16 weight part of potassium persulfate and the complex monomer pre-emulsion composed of 30 weight part of deionized water, 68.78 weight part of butylacrylate, 0.52 weight part of allyl methacrylate, 7.62 weight part of vinyl terminated polydimethylsiloxane (VPDMS, Mw=5000 g/mol), 0.08 weight part of polymethylhydrogensiloxane (PMHS, Mw=6000 g/mol), 0.04 weight part of Pt catalyst (product name; Syl-off®4000 Catalyst) and 1.16 weight part of potassium oleate, followed by reaction for 5 hours at 65° C. to prepare the acryl-silicon complex IPN core.

Microagglomeration and hard shell polymerization were performed in the same manner as described in Example 1. The glass transition temperatures of the core and the acryl-silicon rubber complex polymer were −64.9° C. and −40.4° C. respectively.

Comparative Example 3

To a seed latex prepared in the same manner as described in Example 1 were added 1.16 weight part of potassium persulfate and the complex monomer pre-emulsion composed of 30 weight part of deionized water, 76.42 weight part of butylacrylate, 0.58 weight part of allyl methacrylate and 1.16 weight part of potassium oleate, followed by reaction for 4 hours at 65° C. to prepare the acryl-silicon complex IPN core.

Microagglomeration and hard shell polymerization were performed in the same manner as described in Example 1. The glass transition temperatures of the core and the acryl-silicon rubber complex polymer were −46.1° C. and −26.5° C. respectively.

Comparative Example 4

To a seed latex prepared in the same manner as described in Example 1 were added 1.16 weight part of potassium persulfate and the complex monomer pre-emulsion composed of 30 weight part of deionized water, 49.67 weight part of butylacrylate, 0.38 weight part of allyl methacrylate, 26.68 weight part of vinyl terminated polydimethylsiloxane (VPDMS, Mw=5000 g/mol), 0.27 weight part of polymethylhydrogensiloxane (PMHS, Mw=6000 g/mol), 0.13 weight part of Pt catalyst (product name; Syl-off®4000 Catalyst) and 1.16 weight part of potassium oleate, followed by reaction for 6 hours at 65° C. to prepare the acryl-silicon complex IPN core.

Microagglomeration and hard shell polymerization were performed in the same manner as described in Example 1. The glass transition temperatures of the core and the acryl-silicon rubber complex polymer were −83.2/−51.6° C. and 63.2/−26.4° C. respectively.

Experimental Example 2

The vinyl chloride resins containing the acryl-silicon rubber complex polymer as an impact modifier prepared in Examples 3~5 and Comparative Examples 3~4 were tested for impact strength and weatherability. The results are shown in Table 2.

A: Impact strength (kg·cm/cm): Test samples were prepared and then Izod impact strength was measured for each sample by ASTM D 256.

B: Weatherability: Each sample was exposed on the Sunshine-weather-ometer for 300 hours and then the differences among the values of Izod impact strength and the values of yellowness index were measured.

the weight of the acryl-silicon complex IPN core composition). The above results indicate that a decrease in compatibility of each composition results in phase separation with reduced impact strength.

Examples 6~8 and Comparative Examples 5~6

Seeds were prepared in the same manner as described in Example 1. The acryl-silicon complex IPN cores were prepared with different contents of polymethylhydrogensiloxane, a silicon rubber cross-linking agent. Agglomeration and hard shell polymerization were performed in the same manner as described in Example 1 to give the acryl-silicon rubber complex impact modifier particle dispersion.

TABLE 2

| Content (weight part) | | Example 3 | Example 4 | Example 5 | Comparative Example 3 | Comparative Example 4 |
|---|---|---|---|---|---|---|
| Sees | ST | 7.15 | 7.15 | 7.15 | 7.15 | 7.15 |
|  | AN | 0.79 | 0.79 | 0.79 | 0.79 | 0.79 |
|  | DVB | 0.06 | 0.06 | 0.06 | 0.06 | 0.06 |
| Complex IPN core | BA | 74.51 | 72.60 | 68.78 | 76.42 | 49.67 |
|  | AMA | 0.56 | 0.55 | 0.52 | 0.58 | 0.38 |
|  | VPDMS | 1.91 | 3.81 | 7.62 | — | 26.68 |
|  | PMHS | 0.02 | 0.04 | 0.08 | — | 0.27 |
|  | Tg (° C.) | −57.3 | −60.1 | −64.9 | −46.1 | −83.2/−51.6 |
| Microagglomeration | Sodium Sulfate | 1.28 | 1.28 | 1.28 | 1.28 | 1.28 |
| Hard shell | MMA | 15.0 | 15.0 | 15.0 | 15.0 | 15.0 |
| Complex polymer | Mean diameter (nm) | 300 | 295 | 305 | 293 | 302 |
|  | Tg (° C.) | −34.1 | −36.8 | −40.4 | −26.5 | −63.2/−26.4 |
| Impact strength of | 23° C. | 111 | 117 | 125 | 98 | 89 |
| PVC + complex polymer, | −10° C. | 52 | 58 | 65 | 41 | 48 |
| (0 hr exposure; kg · cm/cm) | | | | | | |
| Impact strength of | 23° C. | 67 | 61 | 65 | 39 | 49 |
| PVC + complex polymer | −10° C. | 34 | 38 | 36 | 26 | 32 |
| (300 hr exposure; kg · cm/cm) | | | | | | |
| ΔYI 300 hr exposure | | 15 | 14 | 17 | 31 | 18 |

As shown in Table 2, the weatherability of the acryl impact modifier of Comparative Example 3 was reduced. The impact modifier of Comparative Example 4 did not exhibit a single Tg when the rubber content was more than 30 weight part (for The compositions of the acryl-silicon rubber complex polymer and the physical properties of the vinyl chloride resin containing it as an impact modifier are shown in Table 3.

TABLE 3

| Content (weight part) | | Example 6 | Example 7 | Example 8 | Comparative example 5 | Comparative example 6 |
|---|---|---|---|---|---|---|
| Seed | ST | 7.15 | 7.15 | 7.15 | 7.15 | 7.15 |
|  | AN | 0.79 | 0.79 | 0.79 | 0.79 | 0.79 |
|  | DVB | 0.06 | 0.06 | 0.06 | 0.06 | 0.06 |
| Complex IPN core | BA | 71.84 | 71.84 | 71.84 | 71.84 | 71.84 |
|  | AMA | 0.54 | 0.54 | 0.54 | 0.54 | 0.54 |
|  | VPDMS | 4.60 | 4.58 | 4.53 | 4.62 | 4.38 |
|  | PMHS | 0.02 | 0.04 | 0.09 | — | 0.24 |
|  | Tg (° C.) | −61.0 | −59.8 | −55.4 | −85.2/−51.3 | −27.2 |
| Microagglomeration | Sodium Sulfate | 1.28 | 1.28 | 1.28 | 1.28 | 1.28 |
| Hard shell | MMA | 15.0 | 15.0 | 15.0 | 15.0 | 15.0 |
| Complex polymer | Mean diameter (nm) | 301 | 295 | 295 | 294 | 298 |
|  | Tg (° C.) | −36.8 | −35.5 | −34.8 | −63.2/−27.1 | −22.5 |

TABLE 3-continued

| Content (weight part) | | Example 6 | Example 7 | Example 8 | Comparative example 5 | Comparative example 6 |
|---|---|---|---|---|---|---|
| Impact strength of PVC + complex polymer (kg·cm/cm) | 23° C. | 109 | 114 | 112 | 101 | 87 |
| | −10° C. | 50 | 55 | 54 | 41 | 42 |
| Gloss (%) | | 50 | 53 | 58 | 33 | 55 |

As shown in Table 3, the resin without the addition of the silicon rubber cross-linking agent of Comparative Example 5 did not exhibit a single Tg but showed phase-separation, indicating a decrease of impact strength and gloss. The complex polymer of Comparative Example 6 that contained more than 3 weight part of the silicon cross-linking agent (for the silicon rubber content) exhibited decreased impact strength.

Examples 9~11 and Comparative Example 7~8

Acryl-silicon rubber complex impact modifiers were prepared in the same manner as described in Example 7 except that the polymethylhydrogensiloxane, a silicon rubber cross-linking agent, and vinyl terminated polydimethylsiloxane were polymerized with different molecular weights.

The compositions of the acryl-silicon rubber complex polymer and the physical properties of the vinyl chloride resin containing it as an impact modifier are shown in Table 4.

TABLE 4

| Content (weight part) | | Example 9 | Example 10 | Example 11 | Comparative Example 7 | Comparative Example 8 |
|---|---|---|---|---|---|---|
| Seed | ST | 7.15 | 7.15 | 7.15 | 7.15 | 7.15 |
| | AN | 0.79 | 0.79 | 0.79 | 0.79 | 0.79 |
| | DVB | 0.06 | 0.06 | 0.06 | 0.06 | 0.06 |
| Complex IPN core | BA | 71.84 | 71.84 | 71.84 | 71.84 | 71.84 |
| | AMA | 0.54 | 0.54 | 0.54 | 0.54 | 0.54 |
| | VPDMS | 4.58 | 4.58 | 4.58 | 4.58 | 4.58 |
| | PMHS | 0.04 | 0.04 | 0.04 | 0.04 | 0.04 |
| | Tg (° C.) | −60.4 | −63.5 | −66.2 | −56.1 | −50.2 |
| Molecular weight g/mol | VPDMS | 6000 | 8000 | 12000 | 2000 | 6000 |
| | PMHS | 5000 | 5000 | 7000 | 5000 | 500 |
| Hard shell | MMA | 15.0 | 15.0 | 15.0 | 15.0 | 15.0 |
| Complex polymer | Mean diameter (nm) | 301 | 299 | 300 | 303 | 302 |
| | Tg (° C.) | −37.1 | −38.2 | −39.6 | −27.0 | −26.4 |
| Impact strength of PVC + complex polymer (kg·cm/cm) | 23° C. | 113 | 119 | 122 | 105 | 100 |
| | −10° C. | 56 | 54 | 60 | 46 | 44 |

As shown in Table 4, when the vinyl terminated polydimethylsiloxane, whose weight average molecular weight was less than 4000 g/mol, was used in Comparative Example 7, the impact strength of the final resin was reduced. When the silicon rubber cross-linking agent having a molecular weight less than 1000 g/mol was used (Comparative Example 8), impact strength was also reduced.

INDUSTRIAL APPLICABILITY

As explained hereinbefore, the acryl-silicon rubber complex IPN polymer of the present invention exhibits excellent impact resistance, weatherability and gloss, so that it can be effectively used as an impact modifier for vinyl chloride resin.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An acryl-silicon rubber complex polymer, which has an impact strength of 50~130 kg·cm/cm, a gloss of 50~70 and a seed-core-shell structure, wherein the seed has a cross-linking structure of a vinyl monomer and a hydrophilic monomer and is prepared by polymerization of 65~99 weight part of a vinyl monomer, 0.5~30 weight part of a hydrophilic monomer and 0.5~5 weight part of a cross-linking agent monomer;

the core is a microagglomerated acryl-silicon interpenetrating network (IPN) core which is prepared by a process comprising the steps of first forming on the seed an acryl-silicon IPN wherein 0.1 to 30 weight parts of silicon rubber particles, comprising 97.0 to 99.9 weight parts vinyl terminated polydimethylsiloxane and 0.1 to 3.0 weight parts polymethylhydrogensiloxane per 100 weight parts of silicon rubber, are dispersed in and cross-linked to an acryl rubber continuous phase; followed by microagglomeration by addition of an organic acid or salt to form said microagglomerated acryl-silicon complex IPN core having a mean particle diameter of 150 to 445 nm; and the shell, prepared by graft-polymerization of one or more C1~C4 alkyl methacrylates selected from a group consisting of methyl methacrylate, ethyl methacrylate, propyl methacrylate, butyl methacrylate and isopropyl methacrylate, is formed on the microagglomerated acryl-silicon complex IPN core.

2. The acryl-silicon rubber complex polymer according to claim 1, wherein the mean diameter of the acryl-silicon rubber complex polymer is 200 nm~450 nm.

3. The acryl-silicon rubber complex polymer according to claim 1, wherein the glass transition temperature of the acryl-silicon rubber complex polymer is −120~−50° C.

4. The acryl-silicon rubber complex polymer according to claim 1, wherein the vinyl monomer for constructing the seed is one or more compounds selected from a group consisting of styrene, α-methyl styrene, vinyl toluene and 3,4-dichloro styrene.

5. The acryl-silicon rubber complex polymer according to claim 1, wherein the hydrophilic monomer for constructing the seed is one or more compounds selected from a group consisting of ethyl acrylate, butyl acrylate, 2-ethylhexyl acrylate, methyl methacrylate, benzyl methacrylate, acrylonitrile, hydroxyl methyl methacrylate, and glycidyl methacrylate.

6. The acryl-silicon rubber complex polymer according to claim 1, wherein the seed is a seed latex having a particle size of 40 nm~120 nm.

7. The acryl-silicon rubber complex polymer according to claim 1, wherein the acryl-silicon complex IPN core is composed of 70~99.9 weight part of acryl rubber prepared by polymerization of 97.0~99.9 weight part of C1~C8 alkyl acrylate monomer and 0.1~3.0 weight part of a cross-linking agent monomer, for 100 weight part of the whole acryl rubber.

8. The acryl-silicon rubber complex polymer according to claim 7, wherein the C1~C8 alkyl acrylate is one or more compounds selected from a group consisting of methyl acrylate, ethyl acrylate, propyl acrylate, isopropyl acrylate, butyl acrylate, hexyl acrylate, octyl acrylate and 2-ethylhexyl acrylate.

9. The acryl-silicon rubber complex polymer according to claim 1, wherein the cross-linking agent monomer is one or more compounds selected from a group consisting of 3-butandiol diacrylate, 1,3-butandiol dimethacrylate, 1,4-butandiol diacrylate, 1,4-butandiol dimethacrylate, allyl acrylate, allyl methacrylate, trimethylolpropane triacrylate, tetraethyleneglycol diacrylate, tetraethyleneglycol dimethacrylate and divinyl benzene.

10. The acryl-silicon rubber complex polymer according to claim 7, wherein the weight average molecular weight of the vinyl terminated polydimethylsiloxane is 4,000~50,000 g/mol.

11. The acryl-silicon rubber complex polymer according to claim 7, wherein the weight average molecular weight of the polymethylhydrogensiloxane is 1000~15,000 g/mol.

12. The acryl-silicon rubber complex polymer according to claim 1, wherein the thickness of the shell is 5 nm~50 nm.

13. A vinyl chloride resin composition, which contains 1~20 weight part of the acryl-silicon rubber complex polymer of claim 1, and 80~99 weight part of vinyl chloride resin.

* * * * *